Jan. 11, 1966 B. DRAKE ETAL 3,229,041

VOICE-FREQUENCY SIGNAL RECEIVERS AS USED IN TELEPHONE SYSTEMS

Filed June 11, 1962 2 Sheets-Sheet 1

United States Patent Office 3,229,041

Patented Jan. 11, 1966

3,229,041

VOICE-FREQUENCY SIGNAL RECEIVERS AS USED IN TELEPHONE SYSTEMS

Bernard Drake, Blackheath, London, and Donald Keith Hicks, Hawley, near Dartford, England, assignors to Associated Electrical Industries Limited, London, England, a British company Filed June 11, 1962, Ser. No. 201,438
Claims priority, application Great Britain, June 14, 1961, 21,484/61
4 Claims. (Cl. 179—84)

Figure 1:
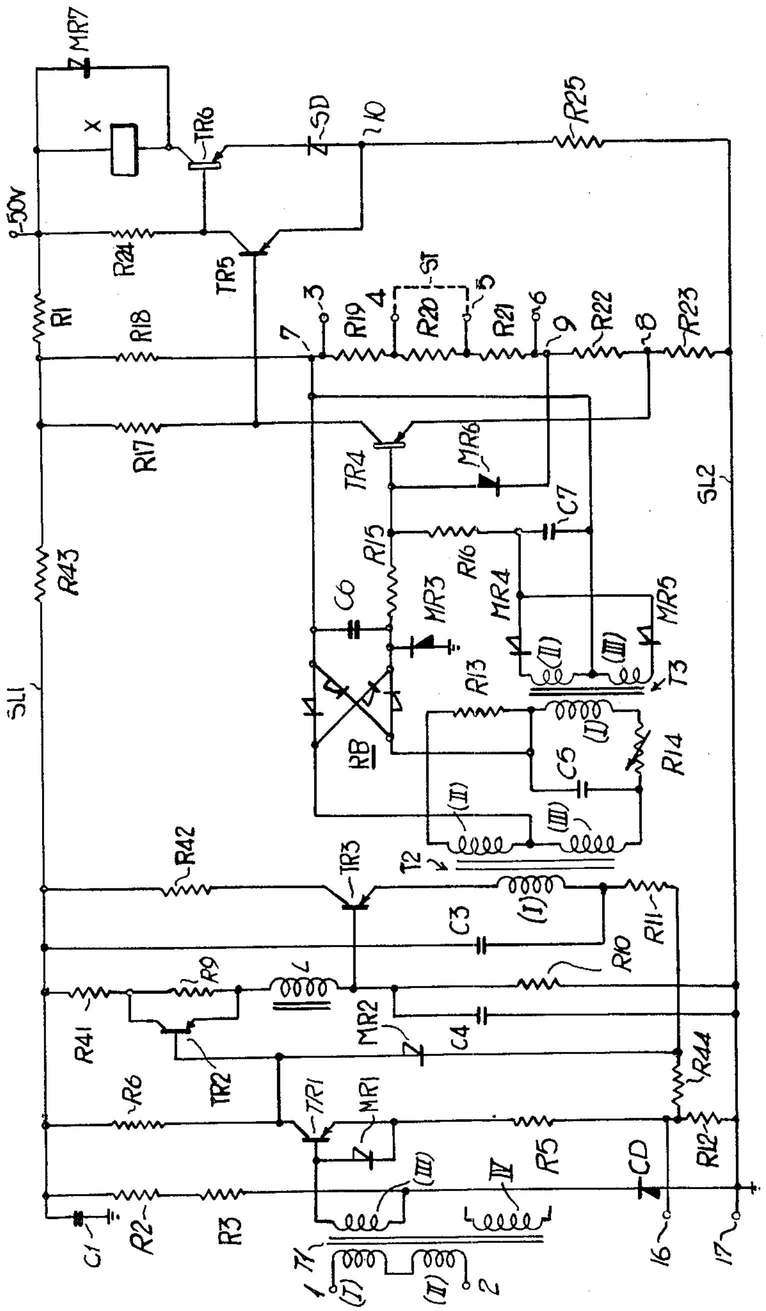

This invention relates to voice-frequency signal receivers as used in telephone systems.

In general, a telephone system voice-frequency signal receiver has to be adapted to discriminate between pure signal currents of a particular signalling voice frequency and other received alternating currents which may be complex currents (e.g. speech currents) containing appreciable components of this signalling voice frequency. It must be realised that in practice so-called "pure" signal currents may contain harmonics, and that the term "pure" is a relative one used for convenience to distinguish actual signal currents from other currents.

It is well known to include, in a telephone system voice-frequency signal receiver, a so-called limiter adapted to limit the input to signal responsive apparatus comprising a circuit tuned to a signalling voice frequency, the constitution and connections of the signal receiver as a whole being such that a limiting action is performed by this limiter in respect of the range of inputs to the signal receiver encountered during normal working.

It is also well known to include, in a telephone system voice-frequency signal receiver, a guard circuit and a signal circuit which are so constituted and connected that, in general, when pure signal current of a signalling voice frequency is received a direct (rectified) output voltage of the signal circuit exceeds an opposing direct (rectified) output voltage of the guard circuit sufficiently to bring about a change of condition of a signal-receiving relay, and when speech currents, or other currents which are not pure signal currents of the signalling voice frequency, are received the direct (rectified) output voltage of the guard circuit suffices to prevent the signal circuit from bringing about such change of condition, although the received currents may contain appreciable components of the signalling voice frequency. In the case of a signal receiver comprising such a guard circuit and signal circuit, an important criterion relating to performance is what has been termed the guard coefficient, which may be defined as the number of decibels below an input current of the signalling voice frequency at which a simultaneous input current of another frequency in the range catered for (constituting an interfering current) has to be applied so as just to prevent the input current of the signalling voice frequency from bringing about the relevant change of condition of the signal-receiving relay.

The present invention has as its main object the provision of an improved voice-frequency signal receiver, of the type having a single signal-receiving relay and adapted to respond to signal currents of a single signalling voice frequency, which (I) exploits modern transistor techniques very advantageously and to a very full degree, and which (II) is by its nature well adapted to perform with little impulse duration distortion the operation of repeating, as a sequence of operated or released periods of the signal-receiving relay of the receiver, a train of impulses due to dialling (or like impulse sending) and received as a train of pulses of signal current of the signalling voice frequency. In achieving this main object, the invention provides an improved form of limiter and an improved form of guard circuit and signal circuit arrangement.

According to one main feature of the invention, a telephone system voice-frequency signal receiver includes a limiter (adapted to limit the input to signal responsive apparatus comprising a circuit tuned to a signalling voice frequency) which comprises in combination an input circuit that is coupled to a preceding voice-frequency circuit of the signal receiver, an output potential divider that is connected across direct current supply leads and has an intermediate point connected or coupled to a succeeding voice-frequency circuit of the signal receiver, and a limitation-producing transistor that in effect operates as a so-called emitter follower and has its base connected directly or indirectly to said input circuit and has its collector/emitter path connected across part of said output potential divider, the arrangement as a whole being such that operation of the limiter in response to pure signal current of the signalling voice frequency received at the receiver, this current being of material magnitude, is such that excursions of one sign of the received signal current give rise in effect to excursions of the voltage of the base of the limitation-producing transistor that serve to bring this transistor to a fully-conducting (bottomed) condition, and that excursions of opposite sign of the received signal current give rise in effect to excursions of the voltage of the base of the limitation-producing transistor that serve to bring this transistor to a substantially non-conducting (cut-off) condition.

In the case of one especially contemplated specific form of telephone system voice-frequency signal receiver in accordance with the invention, the input circuit of the limiter includes an input potential divider which comprises resistors and the collector/emitter path of an input circuit transistor connected in series between a first direct current supply lead that is a live lead when the signal receiver concerned is connected in circuit for use and a second direct current supply lead that is an earthed lead when this signal receiver is so connected. The output potential divider of the limiter comprises a first resistor, a second resistor, a choke coil, and a third resistor which are connected in series, in the order stated, between the first (live) direct current supply lead and the second (earthed) direct current supply lead, and further comprises a capacitor which is connected across the third resistor, and it is the junction between the choke coil on the one hand, and the third resistor and the capacitor on the other hand, which is connected or coupled to a succeeding voice-frequency circuit of the signal receiver. The limitation-producing transistor of the limiter has its emitter connected to the junction between the second resistor of the output potential divider and the choke coil of this potential divider, and has its collector connected to the junction between the first and second resistors of the output potential divider. It is arranged that the constants of the components of the output potential divider of the limiter are such that the emitter load of the limitation-producing transistor of the limiter is substantially resistive at the signalling frequency, and are also such that the choke coil and the capacitor and the third resistor constitute a half-section filter which is effectively (for the purposes concerned) of the low-pass type and which has a frequency of minimum attenuation equal to the signalling frequency and has a cut-off frequency intermediate the signalling frequency and the second harmonic of the signalling frequency. This filter enables the limiter to be followed by a guard circuit and signal circuit arrangement having a high guard co-efficient (e.g. a guard co-efficient of the order of 16 decibels), since it serves, when the limiter is so followed, to prevent harmonics produced by the limiter in respect of a true signal from producing a false guarding action operating to block effective response of the signal receiver to the signal. The potential-divider nature of the emitter load of the limitation-producing transistor of the limiter facilitates arranging that while the collector/emitter voltage of the transistor is maintained at a relatively low value, to cause the limiting action to occur at relatively low level voice-frequency inputs, the voltage between the emitter and earth is kept relatively high. As a consequence of this, there is no difficulty in arranging, without using an input potential divider of such undesirably low resistance that the presence of this divider seriously reduces the stage gain of the transistor amplifying stage that the limitation-producing transistor of the limiter in effect constitutes, that this amplifying stage is effectively stabilized, so far as its direct current working point is concerned, against changes in ambient temperature. Since the limitation-producing transistor of the limiter is connected to operate in effect as an emitter follower, it has a relatively high input impedance.

According to another important feature of the invention a telephone system voice-frequency signal receiver includes a guard circuit and signal circuit arrangement wherein the guard circuit has an output rectifying means arranged and connected so that any direct (rectified) output voltage produced by the guard circuit is in effect injected into the emitter/base circuit of a succeeding transistor of the signal receiver in such manner that it acts, or tends to act, in opposition to a forward standing biasing voltage pertaining to this emitter/base circuit, and wherein the signal circuit has an output rectifying means arranged and connected so that any direct (rectified) output voltage produced by the signal circuit is in effect injected into said emitter/base circuit in such manner that it acts, or tends to act, to assist said forward standing biasing voltage, and wherein said emitter/base circuit includes, in addition to the arrangement for providing said forward standing biasing voltage, a clamping rectifier which is associated with the guard circuit and which is normally in its conducting condition and which is arranged and connected so that when, following a period in which it is in this conducting condition, the magnitude of the direct output voltage produced by the guard circuit next rises above a predetermined threshold value, this rise serves to bring it to the non-conducting condition and thereby renders the condition of said succeeding transistor dependent on a resultant of the forward standing biasing voltage and of the direct output voltage produced by the guard circuit and of the direct output voltage produced by the signal circuit. Herein, the term "forward," when applied to a biasing or like voltage pertaining to the emitter/base circuit of a transistor, means that the polarity of the voltage is such that the voltage is adapted to bring about, or to assist in bringing about, the conduction of the transistor.

By the use of a guard circuit and signal circuit arrangement of the improved form just described, it can readily be arranged that the signal receiver concerned is unaffected by received voice-frequency currents (e.g. noise currents) that are too low in level to produce proper limiting action in a limiter that precedes the guard circuit and signal circuit arrangement. In general, a guard circuit and signal circuit arrangement of this form also possesses the advantage that it permits a larger degree of departure from perfect balance to be tolerated in a bridge arrangement that is used to separate currents of the signalling voice-frequency from currents of other frequencies for the purpose of providing the respective inputs to the signal and guard circuits. Such departure from perfect balance may arise for example after a signal receiver incorporating such a bridge arrangement has been put into service, being caused by changes in the constants of the bridge components due to ageing.

The previously-mentioned and other features of the invention are exemplified in the two improved voice-frequency signal receivers, constituting specific embodiments of the invention, which will now be described with reference to the accompanying drawings comprising FIGS. 1 and 2. The first of these drawings is a circuit diagram illustrating the circuit of one of these two signal receivers and the second of these drawings is a circuit diagram illustrating the circuit of the other of these two signal receivers.

Referring firstly to the said FIG. 1, the particular voice-frequency signal receiver which is illustrated in this figure is a telephone system voice-frequency signal receiver which achieves the previously-mentioned main object of the invention.

The telephone system voice-frequency signal receiver concerned comprises an electromagnetic signal-receiving relay X which is preferably of a low-impedance type. For simplicity, the contacts of this relay are not represented in the circuit diagram. The relay is normally in an unoperated condition, and the receiver is arranged to bring about the operation of the relay in response to the receipt of a pulse of signal current of a signalling voice frequency of 2280 cycles per second.

The signal receiver has input terminals 1 and 2, and the primary windings (I) and (II) of an input transformer T1 of the receiver are connected in series, in series-aiding relationship, across these terminals. The receiver includes an input amplifier, constituting a buffer amplifier, which is a transistor amplifier constituted by a transistor TR1. A secondary winding (III) of the input transformer T1 is connected in the base circuit of transistor TR1. The transformer T1 has a further secondary winding (IV) which is provided to serve for feeding a so-called splitting amplifier and which does not directly concern the present invention. For simplicity, the connections of this winding (IV) are not shown in the circuit diagram. When, as will hereinafter in this description be assumed to be the case, the signal receiver is in service in a telephone system, voice-frequency currents appearing in the line coupled to the input terminals 1 and 2 produce, of course, corresponding voice-frequency currents and voltages in the base circuit of transistor TR1. It is preferred to arrange that the input impedance of the signal receiver, looking into the primary windings (I) and (II) of the input transformer T1, is 30,000 ohms as regards the signal receiver alone, but is effectively 600 ohms by reason of the effect of the circuit connected to the secondary winding (IV) of transformer T1.

The buffer amplifier constituted by the transistor TR1 serves to cause the input impedance of the signal receiver to be, as regards the signal receiver alone, of a substantially constant high value (e.g. 30,000 ohms as just stated) over the whole working range of input levels. The transistor TR1 is connected to derive its power supply from two direct current supply leads comprising a first (live and negative) direct current supply lead SL1 and a second (earthed and positive) direct current supply lead SL2, the supply lead SL1 being a supply lead which is connected to "exchange negative battery" (minus 50 volts) by way of smoothing and decoupling resistors R1 and R43 and which has a smoothing and de-coupling capacitor C1 connected between it and earth. The base circuit of transistor TR1 includes, in addition to the secondary winding (III) of the input transformer T1, two resistors R2 and R3, a rectifier MR1, and a so-called compensating diode CD. The resistors R2 and R3 and the compensating diode CD are connected in series between the direct current supply leads SL1 and SL2 to form a potential divider, and the rectifier MR1 is connected between the base of transistor TR1 and the emitter of this transistor. The compensating diode CD serves to stabilize the working point of transistor TR1, which functions as a "Class A" amplifier, against variation of ambient temperature. The emitter circuit of transistor TR1 includes a resistor R5 which serves to provide a material degree of negative feedback. This feedback takes part in stabilizing the input impedance of the signal receiver. The emitter circuit of transistor TR1 also includes a resistor R12 which may for the purposes of adjustment of the receiver be short-circuited if required by strapping terminals 16 and 17. The collector of transistor TR1 is connected to the direct current supply lead SL1 by way of resistor R6, and is connected to the junction between two feed resistors R11 and R44 by way of a rectifier MR2. The resistors R11, R44 and R12 serves as feed resistors for a transistor TR3 and have associated with them a decoupling capacitor C3 to prevent them from acting as load resistors. As regards voltages applied to the base of transistor TR1 through the medium of the input transformer T1, the rectifier MR1 conducts in response to high-level positive-going half-waves that tend to produce a material reversed voltage between the base and emitter of the transistor, and provides an alternative current path for such half waves to protect the transistor. As regards voltages appearing at the collector of transistor TR1, the rectifier MR2 conducts in response to high-level positive-going half waves (produced by high-level negative-going half waves at the base of the transistor) and thereby ensures that the transistor is not bottomed.

The buffer amplifier constituted by the transistor TR1 is followed by a limiter which comprises an input circuit, an output potential divider and a limitation-producing transistor TR2. The input circuit of the limiter includes a conductive series circuit which involves resistors R6, R5 and R12, and which is connected across the direct current supply leads SL1 and SL2, and which constitutes what is in effect, so far as working point potentials existing in the idle condition of the receiver are concerned, an input potential divider of the limiter. This input potential divider comprises, in addition to the three resistors just mentioned, the collector/emitter path of transistor TR1, which transistor serves in effect as an input circuit transistor of the limiter. The output potential divider comprises a first resistor R41, a second resistor R9, a choke coil L, and a third resistor R10 which are connected in series between the direct current supply leads SL1 and SL2, and further comprises a capacitor C4 which is connected across resistor R10. This potential divider has an intermediate point (namely the junction between the choke coil L on the one hand and resistor R10 and capacitor C4 on the other hand) connected to the base of transistor TR3. The transistor TR2 in effect operates as a so-called emitter follower and acts primarily as a voltage amplitude limiter. It has its base connected to an intermediate point (namely the junction between resistor R6 and the collector of transistor TR1) in the input potential divider, and has its emitter connected to an intermediate point (namely the junction between resistor R9 and the choke coil L) in the output potential divider, and has its collector connected to a further intermediate point (namely the junction between resistors R41 and R9) in the output potential divider. The resistors R9, R10 and R41 may have resistances of 2,200 ohms, 5,100 ohms and 1,000 ohms respectively, the capacitor C4 may have a capacity of 0.018 microfarad, and the choke coil L may have an inductance of 230 millihenries. Operation of the limiter in response to pure signal current of the signalling voice frequency (2280 cycles per second) received at the receiver, this current being of material magnitude, is such that excursions of one sign of the received signal current give rise in effect to excursions of the voltage of the base of transistor TR2 that serve to bring the transistor to a fully-conducting (bottomed) condition, and that excursions of opposite sign of the received signal current give rise in effect to excursions of the voltage of the base of transistor TR2 that serve to bring the transistor to a substantially non-conducting (cut-off) condition. The constants of the components R41, R9, L, R10 and C4 of the output potential divider are chosen to be such that the emitter load of transistor TR2 is substantially resistive at the signalling frequency, and such that the choke coil L and the capacitor C4 and the resistor R10 constitute a half-section filter which is effectively (for the purposes concerned) of the low-pass type and which has a frequency of minimum attenuation of 2280 cycles per second (i.e. equal to the signalling frequency) and which has a cut-off frequency of about 3000 cycles per second (i.e. intermediate the signalling frequency and the second harmonic of the signalling frequency). The filter serves to prevent harmonics produced by the limiter in respect of a true signal from producing a false guarding action (operating to block effective response of the signal receiver to the signal) in a guard circuit and signal circuit arrangement that follows a buffer amplifier constituted by the transistor TR3 and that has a high guard coefficient. Various advantages of the form of limiter concerned have been referred to earlier in this specification.

One function of the buffer amplifier constituted by the transistor TR3, which works in a linear mode, is to separate the limiter from the input circuit of a bridge arrangement (comprising two transformers T2 and T3, two resistors R13 and R14, and a capacitor C5) that is used to separate currents of the signalling voice frequency from currents of other frequencies for the purpose of providing the respective inputs to the signal and guard circuits of the previously-mentioned guard circuit and signal circuit arrangement. This separation enables optimum working of both the limiter and the bridge arrangement to be obtained. Another function of the buffer amplifier constituted by the transistor TR3 is to provide a low source impedance for the bridge arrangement. The transistor TR3 has its base connected to the junction between the choke coil L on the one hand and resistor R10 and capacitor C4 on the other hand, as already referred to, and has its emitter connected to the earthed direct current supply lead SL2 by way of (in series) the primary winding (I) of the transformer T2 and the previously-mentioned feed resistors R11, R44 and R12. Its collector is connected to the direct current supply lead SL1 by way of a resistor R42.

In the bridge arrangement just referred to, the two secondary windings (II) and (III) of the transformer T2 form two of the four arms of the bridge. The resistor R13 forms a further arm and the remaining arm is formed by the tuned circuit constituted by the primary winding (I) of the transformer T3, the capacitor C5, and the resistor R14. The input to the bridge appears, of course, across the secondary windings (II) and (III) of transformer T2. The tuned circuit is tuned to the signalling voice frequency of 2280 cycles per second. The transformer T3 of this tuned circuit is provided with a trimming adjusting means for adjusting the effective inductance of the primary winding (I) for tuning purposes, and the resistor R14, which is variable, serves for adjustment of the magnification or "Q" of the circuit and thereby enables the circuit to be adjusted (as it must be) to cause the bridge to be balanced in respect of inputs of the signalling voice frequency. In respect of such inputs, the "dynamic resistance" of the tuned circuit has to be (for balance) effectively equal to the resistance of the resistor R13. When pure signal current of the signalling voice frequency is received, then (ignoring transient initial and terminating conditions) the bridge will be balanced for the fundamental component and only the relatively low level harmonics generated by the limiter and attenuated by the low-pass filter will be fed from the bridge to a rectifier bridge RB forming part of the guard circuit. The secondary windings (II) and (III) of transformer T3 serve as input windings for the signal circuit of the guard circuit and signal circuit arrangement, and with two rectifiers MR4 and MR5 and a capacitor C7 all included in this signal circuit constitutes a full-wave rectifying arrangement. This rectifying arrangement may conveniently be termed the output rectifying means of the signal circuit, since any rectified output voltage produced across the capacitor C7 constitutes a direct output voltage produced by the signal circuit. The rectifier bridge RB and a capacitor C6 constitute a full-wave rectifying arrangement which may conveniently be termed the output rectifying means of the guard circuit, since any rectified output voltage produced across the capacitor C6 constitutes a direct output voltage of the guard circuit.

The output rectifying means of the guard circuit is arranged and connected so that any direct (rectified) output voltage produced by the guard circuit (i.e. produced across capacitor C6 by the guard circuit) is in effect injected into the emitter/base circuit of a succeeding transistor TR4 of the signal receiver in such a manner that it acts, or tends to act, in opposition to a forward standing biasing voltage pertaining to this emitter/base circuit. The transistor TR4 is a silicon transistor, and is connected to function in effect as a "Class C" direct current amplifier. It has its collector connected to the junction between resistors R1 and R43 by way of a resistor R17, and has its emitter connected to the junction 8 between two resistors R22 and R23 which are included in a potential divider that is connected between the junction between resistors R1 and R43 on the one hand and the direct current supply lead SL2 on the other hand. In addition to the resistors R22 and R23, the potential divider just referred to includes resistors R18, R19, R20 and R21, but either resistor R19 or resistor R20 or resistor R21 is short-circuited by a strap as is requisite to cause the receiver to operate when the combined output of the signal and guard circuits changes through zero in the forward direction as regards the emitter/base circuit of the transistor TR4. The circuit diagram shows the receiver as being provided with terminals 3, 4, 5 and 6 to facilitate such strapping. The resistors R19, R20 and R21 are all different from one another in resistance. By way of example, in the circuit diagram a strap ST is shown connected between terminals 4 and 5 to short-circuit resistor R20. The forward standing biasing voltage pertaining to the emitter/base circuit of transistor TR4 (which biasing voltage is necessary to cause the receiver to operate when the combined output of the signal and guard circuits changes through zero in the forward direction as just referred to) is constituted by the voltage between points 7 and 8 in said potential divider. The effective injection into the emitter/base circuit of transistor TR4 of any direct (rectified) output produced by the guard circuit results from the direct connection to point 7 of one terminal of capacitor C6 (the negative terminal as regards such output), and the connection of the other terminal of this capacitor to the base of the transistor by way of a resistor R15. The output rectifying means of the signal circuit is arranged and connected so that any direct (rectified) output voltage produced by the signal circuit (i.e. produced across capacitor C7 by the signal circuit) is in effect injected into the emitter/base circuit of transistor TR4 in such manner that it acts, or tends to act, to assist said forward standing biasing voltage. The effective injection into the emitter/base circuit of transistor TR4 of any direct (rectified) output produced by the signal circuit results from the direct connection to point 7 of one terminal of capacitor C7 (the positive terminal as regards such output) and the connection of the other terminal of this capacitor to the base of the transistor by way of a resistor R16.

The guard circuit and signal circuit arrangement is such that the emitter/base circuit of transistor TR4 includes, in addition to the arrangements for providing the forward standing biasing voltage, a first clamping rectifier MR3 associated with the guard circuit and a second clamping rectifier MR6 more closely associated with the base of the transistor than with the guard circuit. In the idle condition of the signal receiver, each of these two clamping rectifiers is in its conducting condition, and transistor TR4 is not in an effective conducting condition. The guard circuit and signal circuit arrangement as a whole is such that at the beginning of an effective received signal the second clamping rectifier MR6 assumes its non-conducting condition and transistor TR4 assumes an effective conducting condition, and that at the termination of such a signal the rectifier MR6 again assumes its conducting condition and transistor TR4 ceases to be in an effective conducting condition. The operation in this regard is such that transistor TR4 comes into conduction as the second clamping rectifier MR6 comes out of conduction, and that rectifier MR6 comes into conduction as transistor TR4 comes out of conduction. Thus variation of potential at the junction between resistors R15 and R16 is kept small by the combined clamping effects of the second clamping rectifier MR6 and transistor TR4, with the consequence that the direct (rectified) outputs of the signal and guard circuits combine through resistors R16 and R15 without mutual interference. In the idle condition of the signal receiver, the voltage between the base and the emitter of transistor TR4 is effectively that between points 9 and 8. This voltage, although a forward one, is arranged to be too low in magnitude to cause transistor TR4 to assume an effective conducting condition. When, following a period in which each of the clamping rectifiers MR3 and MR6 is in the conducting condition, the magnitude of the direct current output voltage produced by the guard circuit (i.e. produced across capacitor C6 by the guard circuit) next rises above a predetermined threshold value determined by the magnitude of the negative voltage between point 7 and earth, this rise serves to bring the first clamping rectifier MR3 to the non-conducting condition and thereby renders the condition of transistor TR4 dependent on a resultant of the forward standing biasing voltage and of the direct output voltage produced by the guard circuit and of the direct output voltage produced by the signal circuit (i.e. produced across capacitor C7 by the signal circuit).

The guard circuit and signal circuit arrangement has a high guard coefficient of the order of 12 to 17 decibels in respect of interfering currents of frequencies in wide ranges on each side of the signalling voice frequency. Various advantages of the form of guard circuit and signal circuit arrangement concerned have been referred to earlier in this specification. The arrangement takes part in causing the signal receiver to perform with little impulse distortion the operation of repeating, as a sequence of operated periods (separated by unoperated periods) of the signal-receiving relay X, a train of impulses received as a train of pulses of signal current of the signalling voice frequency. To this end, it is arranged that the instant at which transistor TR4 is brought to conduction (to effect the operation of relay X) in response to the receipt of a pulse signal current of the signalling voice frequency is mainly determined by the time of occurrence of the trailing edge of a "peak" that the rise of signal current at the beginning of the pulse produces in the direct output voltage of the guard circuit (i.e. in the voltage produced across capacitor C6 by the guard circuit), and that the instant at which transistor TR4 is subsequently restored to its normal non-conducting condition (to effect the release of relay X) is mainly determined by the time of occurrence of the leading edge of a "peak" that the fall of signal current at the ending of the pulse produces in the direct output voltage of the guard circuit. The two "peaks" referred to are produced by reason of the fact that the bridge arrangement constituted by the elements T2, R13, C5, T3 and R14 is materially unbalanced, in respect of current of the signalling voice frequency, at the beginning and ending of the voice-frequency input to it in respect of the pulse, this state of affairs being due to the facts that at the beginning of such input the voice-frequency current grows to full amplitude less rapidly in the tuned arm of the bridge arrangement than in the other arms and that at the ending of such input the voice-frequency current falls in amplitude less rapidly in this tuned arm than in the other arms. This technique in itself results in a small delay in the response of the signal-receiving relay at the beginning of the voice-frequency input to the bridge arrangement in respect of a received pulse of signal current, but this delay is a relatively stable and constant one over the operating frequency band of the signal receiver, and can be substantially corrected by the use of a suitable signal-receiving relay and/or correcting circuits associated therewith, and can in any case be made relatively small. In the signal receiver now being described, a circuit in shunt to the signal receiving relay X, and comprising a rectifier MR7, serves to increase the lag with which the relay releases on de-energisation, and thereby constitutes a correcting circuit.

The transistor TR4 controls the signal-receiving relay X through the medium of a trigger circuit comprising two transistors TR5 and TR6, this trigger circuit being one in which a resistor R25 is common to the emitter circuits of the two transistors and the emitter circuit of transistor TR6 also includes a silicon diode SD. The transistor TR5, which has its base directly connected to the collector of transistor TR4 and its collector connected to "exchange negative battery" (minus 50 volts) by way of a resistor R24, is normally conducting, this being because transistor TR4 is normally in the non-conducting condition so that the base of transistor TR5 is fed by way of resistor R17 and resistor R1. The transistor TR6, which has its base directly connected to the collector of transistor TR5 and its collector connected to "exchange negative battery" (minus 50 volts) by way of the winding of relay X and the previously-mentioned circuit shunting this winding, is normally in the non-conducting condition. This is because the residual leakage current that flows through transistor TR6 in the non-conducting condition of this transistor produces a sufficient voltage drop across the silicon diode SD to bias, when the transistor TR5 is conducting, transistor TR6 to the non-conducting condition (with transistor TR5 conducting the potential of the base of transistor TR6 is not very different from that of the point 10). Upon the conduction of transistor TR4 in response to the receipt at the signal receiver of a pulse of signal current of the signalling voice frequency, the change of potential of the collector of transistor TR4 triggers the trigger circuit into the condition in which transistor TR5 is non-conducting and transistor TR6 is conducting. The conduction of transistor TR6 effects, of course, the operation of the signal-receiving relay X in response to the pulse of signal current. Upon the restoration of transistor TR4 to its normal non-conducting condition at the end of the pulse, the change of potential of the collector of transistor TR4 triggers the trigger circuit back into its normal condition to effect the release of relay X. It has already been mentioned that the circuit in shunt to the signal-receiving relay X, and comprising the rectifier MR7, serves to increase the lag with which the relay releases on de-energisation. Additionally, this shunt circuit serves to suppress, sufficiently to protect the collector/base junction of transistor TR6, the voltage surge which would otherwise appear across the inductive winding of relay X on release of the relay.

Figure 2:
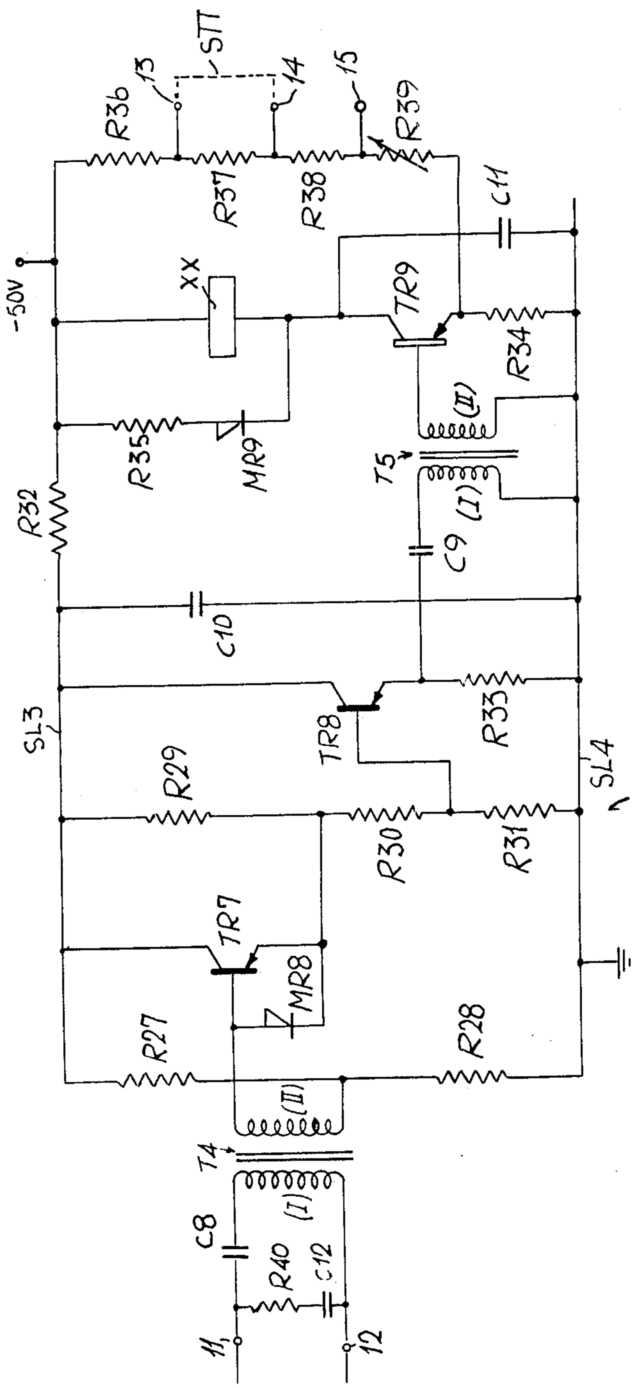

Referring now to FIG. 2, the particular voice-frequency signal receiver which is illustrated in this figure is a relatively simple kind of voice-frequency signal receiver which does not incorporate a guard circuit, and which satisfies the requirements in regard to voice-frequency signal reception in a case where the circumstances do not call for a high degree of immunity from false operation by speech currents. The case especially envisaged is one where the signal receiver is employed for the reception of a voice-frequency trunk-offering signal having a frequency of 3000 cycles per second, and is required to be operative in the face of busy tone having a frequency of 400 cycles per second although generally remaining unoperated in the face of dialling or other surges and speech currents. The signal receiver will be described on the assumption that it is employed, and required to be operative, as just stated.

The voice-frequency signal receiver of FIG. 2 comprises an electromagnetic signal-receiving relay XX. For simplicity, the contact of this relay is not represented in the circuit diagram. The relay is normally in an unoperated condition, and the receiver is arranged to bring about the operation of the relay in response to the receipt of a pulse of signal current of the signalling voice frequency of 3000 cycles per second.

The signal receiver has input terminals 11 and 12, and a capacitor C8 and the primary winding (I) of an input transformer T4 are connected in series across these terminals. Also connected in series across terminals 11 and 12 are a resistor R40 and a capacitor C12. The capacitor C8 and the primary winding (I) of transformer T4 constitute a high-pass filter which has a cut-off frequency of about 2000 cycles per second (i.e. intermediate the frequency of the busy tone and the signalling frequency). This filter serves to prevent busy tone, when present, from interfering with the proper response of the signal receiver to received current of the signalling voice frequency. The resistor R40 and capacitor C12 constitute a shunt circuit serving to cause the signal receiver to present a requisite input imepdance (looking into the receiver from the terminals 11 and 12).

A limiter included in the signal receiver has an input circuit that includes an input potential divider comprising two resistors R27 and R28, and that further includes a rectifier MR8 and the secondary winding (II) of transformer T4. This input circuit is of course coupled by transformer T4 to the voice-frequency circuit in which the primary winding (I) of this transformer is connected. The input potential divider constituted by resistors R27 and R28 is connected across two direct current supply leads comprising a first (live and negative) direct current supply lead SL3 and a second (earthed and positive) direct current supply lead SL4, the supply lead SL3 being a supply lead which is connected to negative battery (minus 50 volts) by way of a smoothing and decoupling resistor R32 and which has a smoothing and decoupling capacitor C10 connected between it and earth. The limiter further comprises a transistor TR7 and an output potential divider comprising three resistors R29, R30 and R31. The output potential divider is connected across the direct current supply leads SL3 and SL4, and has an intermediate point (namely the junction between resistors R30 and R31) connected to the base of a transistor TR8 that constitutes a buffer amplifier. The transistor TR7 operates as a so-called emitter follower. It has its base connected to an intermediate point (namely the junction between the two resistors R27 and R28) in the input potential divider by way of the secondary winding (II) of transformer T4, and has its emitter connected to an intermediate point (namely the junction between resistors R29 and R30) in the output potential divider, and has its collector connected directly to the direct current supply lead SL3. The resistors R27, R28, R29, R30 and R31 may have resistances of 470 ohms, 7500 ohms, 1500 ohms, 560 ohms and 9100 ohms respectively. The rectifier MR8, connected in shunt to the emitter/base junction of transistor TR7, is normally in the non-conducting condition but conducts to protect the emitter/base junction of the transistor when subjected to a surge voltage (e.g. due to dialing) that would without conduction of the rectifier produce a reversed voltage of material magnitude across this junction. Operation of the limiter in response to signal current of the signalling voice frequency (3000 cycles per second) received at the receiver, this current being of material magnitude (i.e. being at least of the lowest signal level catered for), is such that excursions of one sign of the received signal current give rise in effect to excursions of the voltage of the base of transistor TR7 that serve to bring the transistor to a fully-conducting (bottomed) condition, and that excursions of opposite sign of the received signal current give rise in effect to excursions of the voltage of the base of transistor TR7 that serve to bring the transistor to a substantially non-conducting (cut-off) condition.

One function of the buffer amplifier constituted by the transistor TR8, which works in a linear mode, is to separate the limiter from a tuned circuit, constituted by a capacitor C9 and the primary winding (I) of a transformer T5, that serves to render the receiver selectively responsive to received current of the signalling voice frequency of 3000 cycles per second. This separation enables optimum working of both the limiter and the tuned circuit to be obtained. Another function of the buffer amplifier constituted by the transistor TR8 is to provide a low source impedance for the tuned circuit referred to. The elements of the tuned circuit, namely capacitor C9 and winding (I) of transformer T5, are connected in series between the emitter of transistor TR8 and the earthed direct current supply lead SL4. The transistor TR8 has its base connected to the junction between resistors R30 and R31, as already referred to, and has its emitter connected to the earthed direct current supply lead SL4 by way of a resistor R33. Its collector is connected directly to the direct current supply lead SL3.

The secondary winding (II) of transformer T5 is connected between the base of a further transistor TR9 and the earthed direct current supply lead SL4. The transistor TR9 serves as the medium through which current of the signalling frequency (3000 cycles per second) flowing in the tuned circuit constituted by capacitor C9 and the primary winding (I) of transformer T5 brings about the operation of the signal-receiving relay XX. It is arranged for operation in "Class C" manner, i.e. it is normally biased to a substantially non-conducting (cut-off) condition. The transistor TR9 has its collector connected to negative battery (minus 50 volts) by way of the winding of relay XX and a circuit shunting this winding. The last-mentioned circuit, which comprises a rectifier MR9 and a resistor R35, serves to suppress, sufficiently to protect the collector/base junction of transistor TR9, the voltage surge which would otherwise appear across the inductive winding of relay XX on release of the relay. The emitter of transistor TR9 is connected to the junction between two resistors R34 and R39 which are included in a potential divider that is connected between negative battery and the earthed direct current supply lead SL4. In addition to the resistors R34 and R39, the potential divider just referred to includes resistors R36, R37 and R38, but one or both of resistors R37 and R38 may be short-circuited by a strap as is requisite to cause the receiver to be operative over a desired bandwidth. The circuit diagram shows the receiver as being provided with terminals 13, 14 and 15 to facilitate such strapping. By way of example, in the circuit diagram a strap STT is shown connected between terminals 13 and 14 to short-circuit resistor R37. A reservoir capacitor C11 is connected between the collector of transistor TR9 and the supply lead SL4. When a pulse of signal current of the signalling voice frequency (3000 cycles per second) is received at the receiver, this current being of material magnitude, the negative peaks of the resulting alternating voltage in the secondary winding (II) of transformer T5 overcome the positive biasing voltage (due to the direct current flowing through resistor R34 of the potential divider) that normally exists in the base circuit of transistor TR9, with the consequence that this transistor conducts at each such peak. The rectified current which is thus caused to flow in the collector circuit of transistor TR9 operates the signal-receiving relay XX, being smoothed by the capacitor C11 and the inductance constituted by the relay winding.

Should components of non-signal frequency accompany the signal frequency, the limiter output will have the same total amplitude but a reduced level of signal component compared to that which would be obtained with a pure signal input. In this way, a degree of guarding action is obtained which is sufficient to make the receiver immune to impulses and to give a degree of protection against occasional speech during the unanswered condition, after which the receiver can be disconnected because the trunk offering facility is no longer required.

In a contemplated modification of the form of voice-frequency signal receiver that has been described with reference to FIG. 2, provision is made to enable the receiver to respond selectively, on a one signal at a time basis, to different voice-frequency signals differing from one another in regard to signalling frequency. In the case of this modification, a limiter and a buffer amplifier as illustrated in FIG. 2 precede a plurality of tuned circuits each having a signal-receiving relay, and transistor for operating this relay, individual to it. The buffer amplifier has, of course, all the tuned circuits connected in its output circuit, the different tuned circuits being tuned to the different signalling frequencies concerned. The circuit of the transistor individual to a tuned circuit is in each case constituted on similar lines to the circuit of transistor TR9 in FIG. 2.

What we claim is:

1. In a telephone system voice-frequency signal receiver, a limiter connected to derive a power supply from two direct current supply leads of the receiver and serving to limit the signal strength of the input signals conveyed to signal-responsive apparatus of the receiver and comprising in combination:

(a) an input circuit at which the signals to be limited by the limiter are received;

(b) an output potential divider comprising a conductive series circuit, containing a plurality of resistors, connected across the direct current supply leads, and having an intermediate point coupled to the signal-responsive apparatus; and (c) a limitation-producing transistor having its base connected to said input circuit for control of the transistor by signals received at the input circuit, and having its collector-emitter path connected directly across one of said resistors thereby to constitute an effective short-circuit across this resistor when the transistor is brought to a fully conducting condition by an excursion of one sign of received pure signal current and to have no effective shunting effect in regard to this resistor when the transistor is brought to a substantially non-conducting condition by an excursion of opposite sign of such current.

2. In a telephone system voice-frequency signal receiver, a limiter as claimed in claim 1, in combination with an amplifying transistor coupling said intermediate point of said output potential divider to the signal-responsive apparatus and having its base connected to this intermediate point, whereby said output potential divider acts as a potential divider serving to apply a standing biasing voltage to the base of said amplifying transistor.

3. In a telephone system voice-frequency signal receiver, a limiter as claimed in claim 1 in which said output potential divider includes a choke coil and a capacitor and a resistor together constituting a half-section filter which is effectively of the low-pass type, and which has a frequency of minimum attenuation equal to the signaling frequency and has a cut-off frequency intermediate the signaling frequency and the second harmonic of the signaling frequency.

4. In a telephone system voice-frequency signal receiver, a transistor, means for providing a forward standing biasing voltage in the emitter-base circuit of this transistor, a guard circuit having an output rectifying means arranged and connected to inject any rectified output voltage produced thereby into said emitter-base circuit in the direction in opposition to said forward standing biasing voltage and a signal circuit having an output rectifying means arranged and connected to inject any rectified output voltage produced thereby into said emitter-base circuit in the direction in which it tends to assist said forward standing biasing voltage, two resistors over one and the other of which one output terminal of said output rectifying means of said guard circuit and one output terminal of said output rectifying means of said signal circuit are respectively connected to the base of said transistor, a normally conducting clamping rectifier connected between said one output terminal of said output rectifying means of said guard circuit and a point maintained at a datum potential, and connections directly connecting the other output terminal of said output rectifying means of said guard circuit and the other output terminal of said output rectifying means of said signal circuit to a point, in said means for providing a forward standing biasing voltage, that is maintained at a predetermined fixed potential, relative to said datum potential, chosen to be such that said clamping rectifier is brought to the non-conducting condition, to render the condition of said transistor dependent on a resultant of said forward standing biasing voltage and of the rectified output voltages produced by said guard and signal circuits, when the magnitude of the rectified output voltage produced by said guard circuit next rises above a predetermined threshold value following a period in which the rectifier is conducting.

References Cited by the Examiner

UNITED STATES PATENTS

| | | | |
|---|---|---|---|
| 2,686,227 | 8/1954 | Ryall | 179—84 |
| 2,830,128 | 4/1958 | Radcliffe et al. | 179—84 |
| 2,874,312 | 2/1959 | Radcliffe et al. | 307—88.5 |
| 2,883,473 | 4/1959 | McDermott | 179—84 |
| 2,949,543 | 4/1960 | Nordahl et al. | 307—88.5 |
| 3,048,717 | 8/1962 | Jenkins | 307—88.5 |
| 3,098,179 | 7/1963 | VanRossum et al. | 179—84 |

ROBERT H. ROSE, *Primary Examiner.*

WALTER L. LYNDE, *Examiner.*